United States Patent
Chen

(10) Patent No.: US 7,325,775 B2
(45) Date of Patent: Feb. 5, 2008

(54) AUTOMOTIVE GAUGE MOUNTING BRACKET WITH FRICTIONAL FIT APERTURES

(75) Inventor: Ieon Chen, Laguna Hills, CA (US)

(73) Assignee: Innova Electronics Corporation, Fountain Valley, CA (US)

(*) Notice: Subject to any disclaimer, the term of this patent is extended or adjusted under 35 U.S.C. 154(b) by 0 days.

(21) Appl. No.: 10/755,747

(22) Filed: Jan. 12, 2004

(65) Prior Publication Data
US 2005/0151032 A1 Jul. 14, 2005

(51) Int. Cl.
G12B 9/00 (2006.01)
B60R 7/00 (2006.01)
(52) U.S. Cl. .............. 248/27.1; 248/315; 224/400
(58) Field of Classification Search ........... 248/27.1, 248/309.1, 315, 300
See application file for complete search history.

(56) References Cited

U.S. PATENT DOCUMENTS

| | | | | |
|---|---|---|---|---|
| 811,742 A | * | 2/1906 | Petrie | 215/392 |
| 1,284,890 A | * | 11/1918 | Greenleaf | 248/27.1 |
| 1,878,035 A | * | 9/1932 | Vickery | 116/300 |
| 2,301,216 A | * | 11/1942 | Koontz | 248/346.03 |
| 2,457,274 A | * | 12/1948 | Rifken | 248/314 |
| 3,044,039 A | * | 7/1962 | Gregson | 439/347 |
| 3,365,761 A | * | 1/1968 | Kalvig | 248/113 |
| 3,504,876 A | * | 4/1970 | Swanson | 248/27.1 |
| 3,570,108 A | * | 3/1971 | Sarra | 248/27.1 |
| 3,599,910 A | * | 8/1971 | Wipff | 248/27.1 |
| 3,603,551 A | * | 9/1971 | Peterson | 248/314 |
| 3,724,277 A | * | 4/1973 | Parmentier | 73/201 |
| 4,033,489 A | * | 7/1977 | Fowler | 294/159 |
| D247,957 S | * | 5/1978 | Adams | D10/46 |
| D249,938 S | | 10/1978 | Shaffer et al. | |
| 4,507,706 A | * | 3/1985 | Trexler, Jr. | 361/600 |
| 4,807,421 A | * | 2/1989 | Araki et al. | 53/167 |
| 4,939,934 A | * | 7/1990 | Ritzenthaler et al. | 73/431 |
| 4,993,611 A | * | 2/1991 | Longo | 224/148.4 |
| 5,702,076 A | * | 12/1997 | Humber | 248/57 |
| 5,855,388 A | * | 1/1999 | Brewer | 280/288.4 |
| 6,053,043 A | * | 4/2000 | Dannenberg et al. | 73/431 |

OTHER PUBLICATIONS

Equus Products Inc. Catalog, pp. 15-24, 26 (1998).
iEquus Preformance Gauges Tachometers Catalog. (no date).
Equus Products, Inc. Catalog, Automotive Testers, Gauges and Cruise Control, pp. 13-22, 24 (1995).
Sunpro Catalog by Actron, Sunpro Solutions, pp. 11-18 (Nov. 1996).
Pentron Products, Inc. Catalog, pp. 10-20 (1988).

* cited by examiner

*Primary Examiner*—Anita M. King
(74) *Attorney, Agent, or Firm*—Stetina Brunda Garred & Brucker

(57) ABSTRACT

An automotive gauge mounting bracket is provided that is engagable to an automotive vehicle interior. The bracket comprises at least one gauge receiving aperture formed in the bracket. The aperture is provided with a perimeter defining a plurality of displaceable gauge receiving segments. The segments are displaceable in response to insertion of a gauge into the aperture, for friction fit engagement of the gauge directly to the bracket.

12 Claims, 2 Drawing Sheets

AUTOMOTIVE GAUGE MOUNTING BRACKET WITH FRICTIONAL FIT APERTURES

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates to automotive gauges, such as water, voltage and oil gauges. More particularly, the present invention relates to housings or brackets designed to support automotive gauges in place within a vehicle.

Automotive gauges are useful to monitor a wide range of operating conditions within a vehicle. Water, voltage, oil, engine speed, temperature and other conditions are routinely monitored in order to insure proper engine operation and to identify maintenance or repair requirements.

Many vehicles have a limited number of gauges, e.g. for fuel, temperature and engine speed, with other conditions monitored by means of a warning light, rather then gauges. Such warning lights may be viewed as inadequate to provide the level of information desired with respect to the monitored condition, e.g. changes in water temperature, voltage or oil pressure in the vehicle. For example, in some circumstances the water temperature light may not turn on until the water temperature is already far too high. Closer monitoring of the water temperature, which can be effected by use of gauges, may allow the user to take remedial steps.

For these and other reasons add on gauges have become a staple of automotive aftermarket products. The gauges are typically mounted in groups of two or three to a bracket, which may be secured to the vehicle dashboard. Conventional arrangements of such gauge assemblies 11; each having gauges mounted upon a supporting bracket are illustrated at FIGS. 1-3 of the drawings. As shown therein automotive gauge bracket 15 supports a plurality of automotive gauges, 13a, 13b, 13c. The gauges, 13a, 13b, 13c, commonly include a cylindrical gauge body 17, which extends through aperture 19 of housing 15. The body is insertable through aperture 19 until the attached gauge bezel 21 abuts against the bracket 15. Locking ring 23 is threadably engagable to the gauge body 17, to compress against the rear of bracket 15, to hold the gauge in place within the bracket. The bracket 15 may be secured to the vehicle by means of screws or other fasteners, e.g., extending through bracket aperture 25.

While such contemporary gauge kits are useful for many purposes, certain installation or replacement difficulties may arise. For example, depending upon the mounting location, it may be difficult for the installer to reach behind the bracket, through electrical or hydraulic connections, to manipulate the locking ring to hold the gauges in place. Space availability may be limited such that a locking ring of significant depth may be difficult to apply to the gauge from the rear. For example, it may be that the locking ring arrangement requires that the electrical or hydraulic connections be installed from the rear, before or after the gauge has been locked into place within the bracket. These types of difficulties, frequently not realized by a backyard mechanic until after an initial installation effort is ongoing, can prove to be frustrating and time consuming.

Similar difficulties can arise when a gauge becomes defective and needs to be replaced. Moreover, where substitute gauges are approximately the same size, the mounting mechanisms may be different and incompatible with the size, shape or spacing of the original bracket. Similarly, the locking ring from the original gauge may not be suitable to engage threads on a substitute gauge.

Consequently, while the mechanism for mounting gauges within an aftermarket automotive gauge kit are relatively simple, they may result in a variety of difficulties, depending upon the space and location situation, which can be particularly vexing to backyard mechanics.

Accordingly, there exists a need for an automotive gauge mounting bracket that can support a variety of automotive gauges, including gauges having different size bodies, to which automotive gauges can be simply mounted, without the need for rear mounted locking rings or other such rear manipulated locking members.

BRIEF SUMMARY OF THE INVENTION

An automotive gauge mounting bracket is provided that is engagable to an automotive vehicle interior. The bracket comprises at least one gauge receiving aperture formed in the bracket. The aperture is provided with a perimeter defining a plurality of displaceable gauge receiving segments. The segments are displaceable in response to insertion of a gauge into the aperture, for friction fit engagement of the gauge directly to the bracket.

The gauge defines a gauge diameter and the aperture defines an aperture inner diameter, the aperture inner diameter being less then the gauge diameter. In accordance with the present invention, the gauge diameter may vary, though still allowing for friction-fit engagement of the gauge within the aperture.

In one embodiment the displaceable segments define series of radially arrayed slits or cuts of varying lengths (cuts).

In another embodiment, the displaceable segments define a cross shaped aperture, the displaceable interior segments bring forward intermediate recesses of the cross shaped aperture.

In another embodiment the displaceable segments define a plurality of outer arcuate recesses, with displaceable inner segments disposed intermediate the recesses.

DETAILED DESCRIPTION OF THE INVENTION

The foregoing description, taken in conjunction with the impending drawings, is intended to describe the construction and operation of the invention in relation to the illustrated embodiments. However, it is to be understood that the illustrated embodiments are intended as exemplary and not intended as an exhaustive description of each embodiment of the invention that may be later contemplated. As will be apparent to those skilled in the art, the invention may be implemented in various embodiments, as may be appropriate for particular applications, gauge shapes, etc. Accordingly, the disclosure below is not intended to be limiting of other embodiments that may similarly be within the spirit and scope of the present invention.

Figure 1:
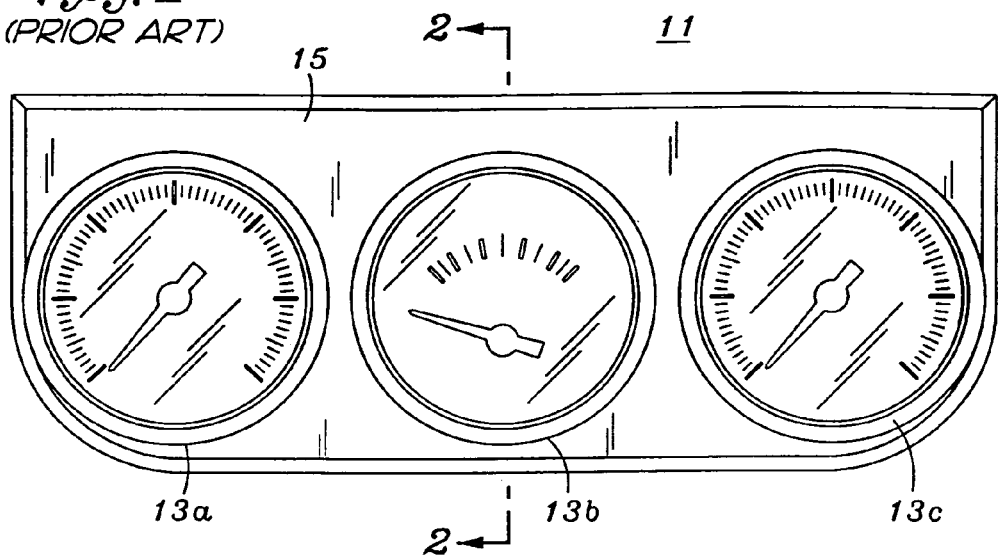
FIG. 1 is a front view of an automotive gauge and housing in accordance with prior art devices.
Figure 2:
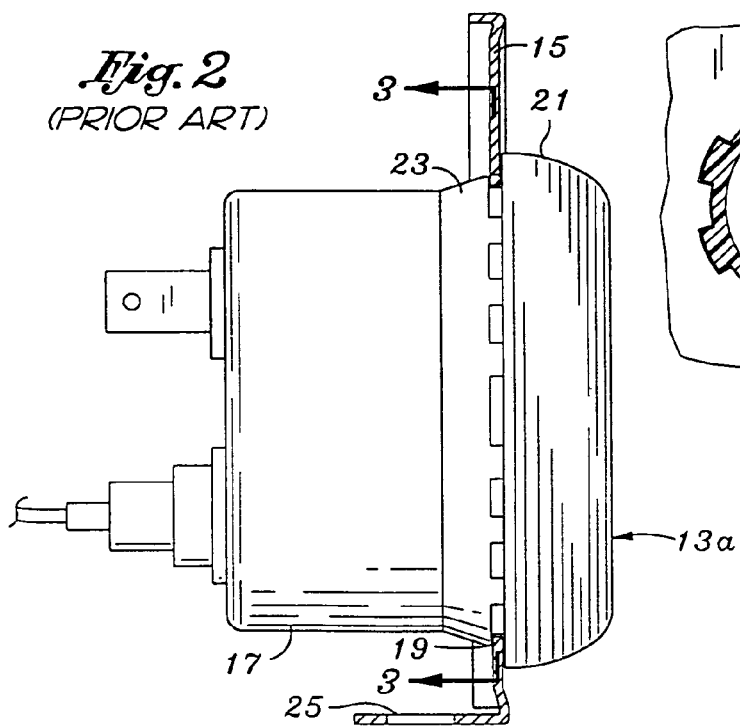
FIG. 2 is a side view of an automotive gauge engaged to a housing, in accordance with prior art devices.
Figure 3:
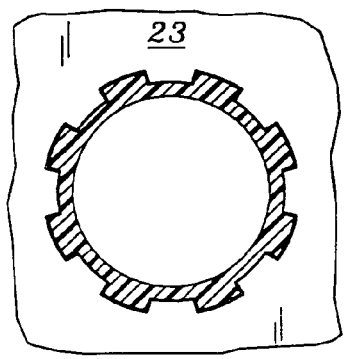
FIG. 3 is a front view of a locking ring used to engage in automotive devices to a housing in accordance with the prior art.
Figure 4:
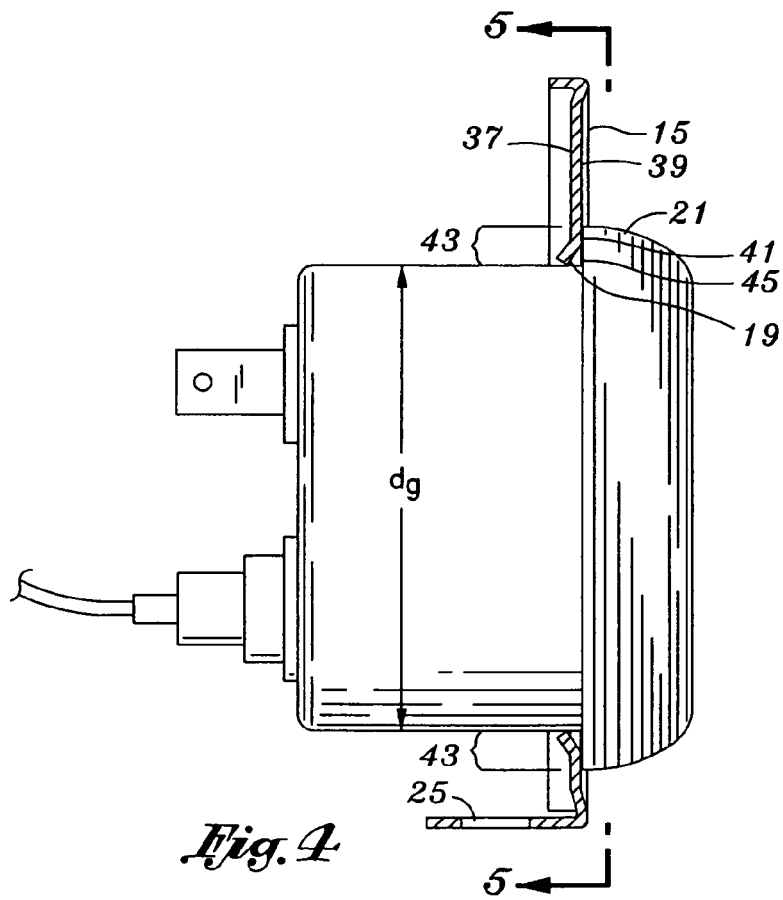
FIG. 4 is a side view of an automotive gauge engagable to a housing constructed in accordance with the present invention.

As noted above, prior art configurations of automotive gauge mounting brackets have been described in relation to FIGS. 1-3. The remaining figures describe bracket constructions that function to receive and securely engage automotive gauges in accordance with the present invention, without the need for lock rings or other mechanisms used to secure the automotive gauge to the bracket.

In accordance with the present invention the automotive gauge mounting bracket is provided with an aperture for receiving an automotive gauge. The aperture defines an inner diameter d1, d2, d3, each of which is less then the diameter of the gauge, $d_g$. The perimeter is also provided with relief cuts 27 or recessed regions 29, 31, to define segments 33, 35, 37 that are formed intermediate the cuts 27 or recesses 29, 31. These segments are displaceable as the gauge is inserted into the aperture 19 to effect a frictional locking engagement between the gauge body and the bracket. The frictional engagement secures the gauge within the bracket without the need for a rear locking member. In such a manner electrical or hydraulic connections may be connected to the gauge, before or after the gauge is inserted into the bracket, without concern for proper engagement of the gauge to the rear of the bracket.

Figure 5:
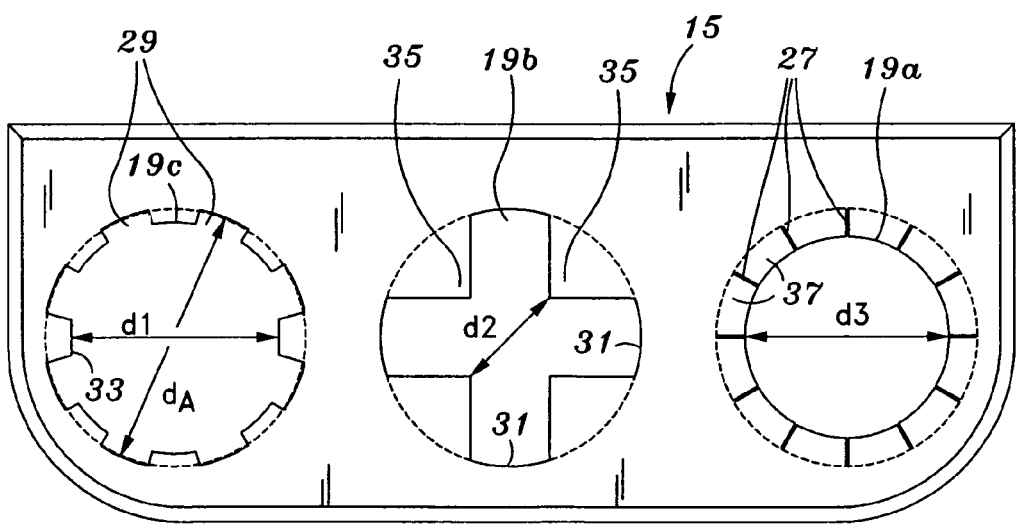
FIG. 5 is a front view of an automotive gauge housing having ultimate friction fit apertures in accordance with the present invention.

FIG. 5 illustrates a bracket 15 wherein the segments and apertures are formed in three alternate configurations. Each construction is designed to function substantially similar insofar as the apertures formed to define a plurality of displaceable segments that receives and engages the gauge body as it is inserted within the aperture.

Aperture 19a is defined as a circular aperture having a plurality of radially arrayed slits or cuts 27, defined by displaceable segments 37 therebetween. Segments 37 are displaced to receive and engage the gauge body as it is inserted within the aperture.

Aperture 19b is defined as a cross-pattern aperture having recessed cutout areas 31, and defining displaceable segments 35 therebetween. As previously indicated, the displaceable segments 35 function to receive and lock the automotive gauge within the housing 15.

Aperture 19c is defined as a pattern of arcuate recesses 29, with displaceable inner arcuate segments 33 formed intermediate the recesses 29. The diameter d1 of the arcuate segments is less then the diameter $d_g$ of the gauge and $d_A$ of the aperture recesses. The diameter $d_A$ of the arcuate recesses is preferably greater than the diameter of the gauge $d_g$.

The bracket 15 may define an interior side 37, an exterior side 39 and a surface 41 about a periphery 43 of the aperture 19. The gauge may define a lip 45 and may be insertable through the aperture 19 from the exterior side 39 to the interior side 37 until the gauge lip 45 contacts the surface 41 about the aperture periphery 43. The segments 33, 35, 37 may be displaced toward the interior side 37 upon insertion of the gauge for resisting removal of the gauge from the bracket 15.

As will be apparent to those skilled in the art, various other configurations or combinations of the disclosed configurations may be implemented within the broader scope and spirit of the present invention. For example, cuts such as cuts 27 (FIG. 5) could be added to recesses 29 of aperture pattern 19c extending from the arcuate recesses. This would allow the recesses to also displace in response to insertion of the gauge. In such a case the diameter of the recesses may be less then the diameter of the gauge, to provide a second locking surface to secure the gauge within the bracket.

What is claimed is:

1. An automotive gauge assembly engagable to an automotive vehicle interior, the assembly comprising:
    a) a bracket;
    b) at least one gauge receiving aperture formed in the bracket;
    c) the aperture defining a plurality of displaceable segments and recesses extending therebetween;
    d) the segments being displaceable in response to insertion of the gauge into the aperture for friction-fit engagement of the gauge to the bracket; and
    e) a gauge disposed in each gauge receiving aperture, each gauge having a gauge diameter and each recesses defining an aperture inner diameter, the aperture inner diameter being less than the gauge diameter.

2. The assembly as recited in claim 1 wherein recesses are provided with a series of radial cuts, the cuts defining additional displaceable segments therebetween.

3. The assembly as recited in claim 1 wherein the recesses define a cross-shape aperture, having a plurality of displaceable interior segments.

4. The assembly as recited in claim 1 wherein the recesses define a plurality of outer arcuate recesses and the displaceable segment defines a plurality of displaceable inner arcuate segments disposed intermediate arcuate recesses.

5. The assembly of claim 2 wherein the radial cuts are of generally equal length.

6. The assembly as recited in claim 1 wherein the aperture is generally circularly shaped.

7. The assembly as recited in claim 1 wherein each of the apertures is of generally equivalent size.

8. The assembly as recited in claim 1 wherein the bracket includes three gauge receiving apertures formed therein.

9. The assembly as recited in claim 1 wherein the segments are equidistantly spaced around the aperture.

10. The assembly as recited in claim 1 wherein the bracket defines an interior side and an exterior side and the segments are displaceable toward the interior side of the bracket.

11. The assembly as recited in claim 10 wherein displacement of the segments in response to insertion of the gauges into the aperture deforms the segments.

12. The assembly as recited in claim 1 wherein the bracket defines an interior side, an exterior side and a surface about the periphery of the aperture, the gauge defining a lip and being insertable through the aperture from the exterior side to the interior side until the gauge lip contacts the surface about the aperture periphery, and the segments being displaceable toward the interior side upon insertion of the gauge for resisting removal of the gauge from the bracket.

* * * * *